US007738868B2

(12) United States Patent
Bajar et al.

(10) Patent No.: US 7,738,868 B2
(45) Date of Patent: Jun. 15, 2010

(54) SYSTEM AND METHOD FOR MANAGING SECURE REGISTRATION OF A MOBILE COMMUNICATIONS DEVICE

(75) Inventors: David Bajar, Kitchener (CA); Allan David Lewis, New Dundee (CA); Wen Gao, Waterloo (CA); Herb A. Little, Waterloo (CA); James Godfrey, Waterloo (CA); Marc Plumb, Kitchener (CA); Michael Kenneth Brown, Kitchener (CA); Neil Patrick Adams, Waterloo (CA)

(73) Assignee: Research In Motion Limited, Waterloo (CA)

( * ) Notice: Subject to any disclaimer, the term of this patent is extended or adjusted under 35 U.S.C. 154(b) by 586 days.

(21) Appl. No.: 10/996,925

(22) Filed: Nov. 24, 2004

(65) Prior Publication Data

US 2006/0111105 A1    May 25, 2006

(51) Int. Cl.
*H04Q 7/20* (2006.01)
(52) U.S. Cl. .................. 455/435.1; 455/410; 713/182
(58) Field of Classification Search .............. 455/435.1, 455/435.2, 435.3, 433; 370/331
See application file for complete search history.

(56) References Cited

U.S. PATENT DOCUMENTS 5,903,832 A * 5/1999 Seppanen et al. ......... 455/435.3
5,953,652 A    9/1999 Amin et al.
5,956,639 A * 9/1999 Armbruster et al. ......... 455/431
6,453,159 B1 * 9/2002 Lewis .......................... 455/411
6,834,341 B1 * 12/2004 Bahl et al. ................... 713/156
2003/0220107 A1 * 11/2003 Lioy et al. ............... 455/435.1
2004/0202329 A1 * 10/2004 Jung et al. .................. 380/273

FOREIGN PATENT DOCUMENTS

EP    0 982 963 A2    3/2000

OTHER PUBLICATIONS

European Search Report; European Patent Office; Apr. 27, 2005; 6 pages.

* cited by examiner

*Primary Examiner*—Lester Kincaid
*Assistant Examiner*—Phuoc Doan
(74) *Attorney, Agent, or Firm*—The Danamraj Law Group, P.C.

(57) ABSTRACT

In one embodiment, a scheme is provided for managing secure registration of a mobile communications device. Upon being provided with an upgraded registration process that requires encryption, the mobile communications device has the option of continuing to register with a network node using a downgraded registration process within a specified time window which involves unencrypted registration requests and responses. Thereafter, the mobile communications device is operable to select between the upgraded and downgraded registration processes.

20 Claims, 6 Drawing Sheets

SYSTEM AND METHOD FOR MANAGING SECURE REGISTRATION OF A MOBILE COMMUNICATIONS DEVICE

CROSS-REFERENCE TO RELATED APPLICATION(S)

This patent application discloses subject matter related to the subject matter disclosed in the following commonly owned co-pending patent applications: (i) "SYSTEM AND METHOD FOR SECURING A PERSONALIZED INDICIUM ASSIGNED TO A MOBILE COMMUNICATIONS DEVICE," filed Nov. 24, 2004, application Ser. No. 10/996,702; (ii) "SYSTEM AND METHOD FOR ASSIGNING A PERSONALIZED INDICIUM TO A MOBILE COMMUNICATIONS DEVICE," filed Nov. 24, 2004, application Ser. No. 10/997,577, which issued on Apr. 8, 2008 as U.S. Pat. No. 7,356,330; and (iii) "SYSTEM AND METHOD FOR PORTING A PERSONALIZED INDICIUM ASSIGNED TO A MOBILE COMMUNICATIONS DEVICE," filed Nov. 24, 2004, application Ser. No. 10/977,555 all of which are incorporated by reference herein.

FIELD OF THE APPLICATION

The present patent application generally relates to wireless packet data service networks. More particularly, and not by way of any limitation, the present patent application is directed to a system and method for managing secure registration of a mobile communications device that is operable to be disposed in a wireless packet data service network.

BACKGROUND

It is becoming commonplace to use wireless packet data service networks for effectuating data sessions with mobile communications devices. In some implementations, indicia such as Personal Information Numbers or PINs are assigned to the devices in order to facilitate certain aspects of service provisioning, e.g., security, validation and service authentication, et cetera. In such scenarios, it becomes imperative that no two devices have the same indicium (i.e., collision). Further, such PIN indicia are mapped to individual Internet Protocol (IP) addresses used in packet-switched networks so that a mobile communications device continues to send and receive messages even if its IP address is changed for some reason. For example, wireless carriers may dynamically assign an IP address to a data-enabled mobile device, and if that device is out of coverage, the previously assigned IP address is reclaimed and recycled for another device requesting service.

Furthermore, because sensitive information may be transmitted in either direction during the registration of a mobile communications device, i.e., from the network to the device and vice versa, attempts are underway to implement secure registration of the devices by providing upgraded software capable of encryption. Whereas implementing encryption may be a straightforward matter, requirements of backward compatibility can give rise to certain lasting security flaws.

SUMMARY

In one embodiment, a scheme is provided for managing secure registration of a mobile communications device. Upon being provided with an upgraded registration process that requires encryption, the mobile communications device has the option of continuing to register with a network node using a downgraded registration process within a specified time window which involves unencrypted registration requests and responses. Thereafter, the mobile communications device is operable to select between the upgraded and downgraded registration processes.

In another embodiment, a method is disclosed for managing secure registration of a mobile communications device, which comprises: registering by the mobile communications device with a network node using a first registration process, the first registration process requiring an authentication key generated by the mobile communications device; sending a registration request to the network node with an indication that the mobile communications device is changing to a second registration process; registering, within a time window, by the mobile communications device with the network node using the second registration process; and upon expiration of the time window, allowing the mobile communications device to select between the first and second registration processes.

In another embodiment, a mobile communications device is disclosed which comprises: logic means operable for registering with a network node using a first registration process, the first registration process requiring an authentication key generated by the mobile communications device; logic means operable for sending a registration request to the network node with an indication that the mobile communications device is changing to a second registration process; logic means operable for registering, within a time window, with the network node using the second registration process; and logic means operable for selecting between the first and second registration processes upon expiration of the time window.

In yet another embodiment, a network system is disclosed for managing secure registration of a mobile communications device, which comprises: means for registering by the mobile communications device with a network node using a first registration process, the first registration process requiring an authentication key generated by the mobile communications device; means for sending a registration request to the network node with an indication that the mobile communications device is changing to a second registration process; means for registering, within a time window, by the mobile communications device with the network node using the second registration process; and means for allowing the mobile communications device to select between the first and second registration processes upon expiration of the time window.

BRIEF DESCRIPTION OF THE DRAWINGS

A more complete understanding of the embodiments of the present patent application may be had by reference to the following Detailed Description when taken in conjunction with the accompanying drawings wherein.

DETAILED DESCRIPTION OF THE DRAWINGS

Figure 1:
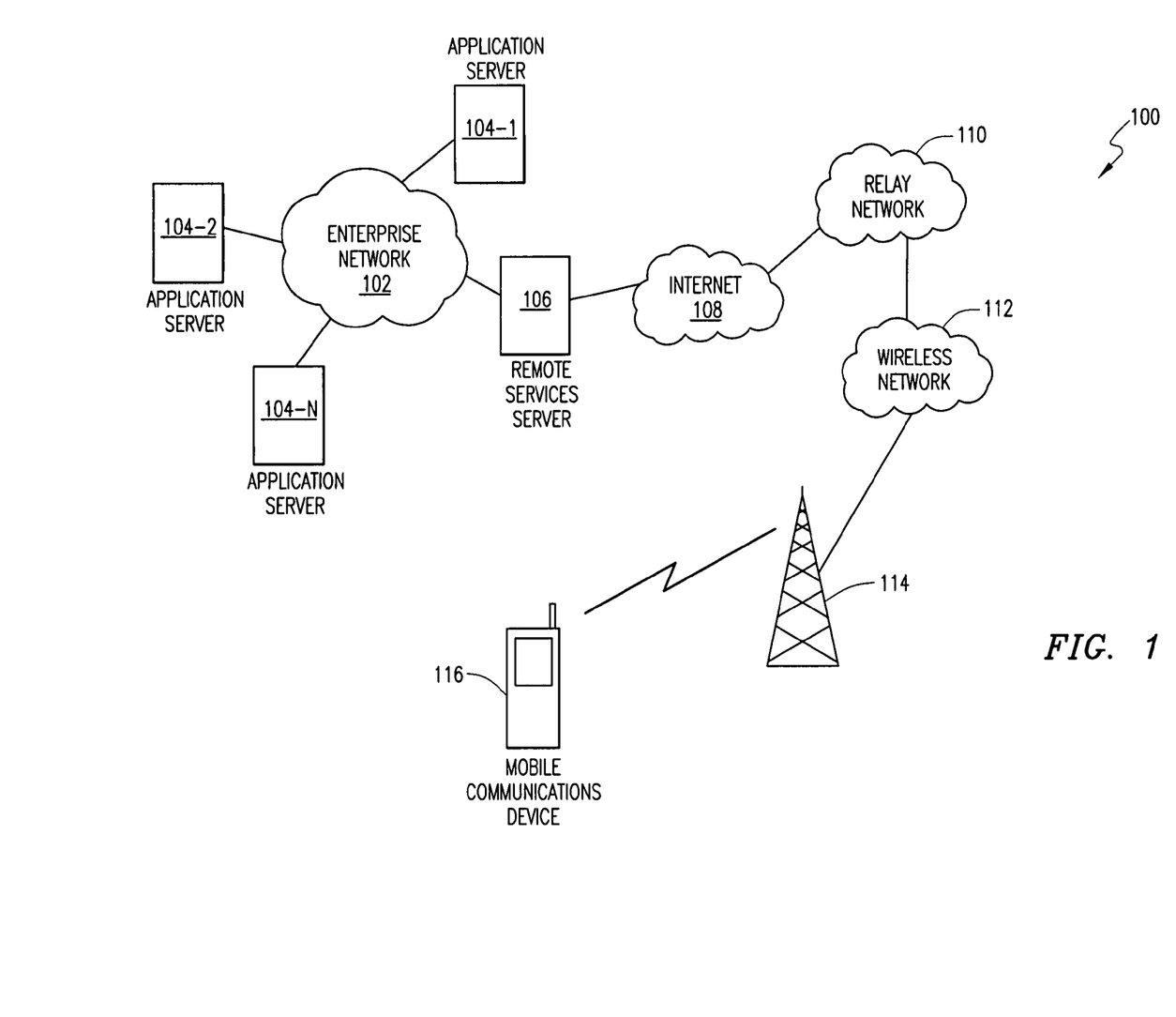
FIG. 1 depicts an exemplary network environment including a wireless packet data service network wherein an embodiment of the present patent application may be practiced.

A system and method of the present patent application will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 including a wireless packet data service network 112 wherein an embodiment of the present patent application may be practiced. An enterprise network 102, which may be a packet-switched network, can include one or more geographic sites and be organized as a local area network (LAN), wide area network (WAN) or metropolitan area network (MAN), et cetera, for serving a plurality of corporate users. A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1, may be operably networked to one or more of the application servers 104-$i$, $i$=1, 2, ..., N, with respect to the services supported in the enterprise network 102.

Additionally, a remote services server 106 may be interfaced with the enterprise network 102 for enabling a corporate user to access or effectuate any of the services from a remote location using a suitable mobile communications device (MCD) 116. A secure communication link with end-to-end encryption may be established that is mediated through an external IP network, i.e., a public packet-switched network such as the Internet 108, as well as the wireless packet data service network 112 operable with MCD 116 via suitable wireless network infrastructure that includes a base station (BS) 114. In one embodiment, a trusted relay network 110 may be disposed between the Internet 108 and the infrastructure of wireless packet data service network 112. In another embodiment, the infrastructure of the trusted relay network 110 may be integrated with the wireless packet data service network 112, whereby the functionality of the relay infrastructure, certain aspects of which will be described in greater detail below, is consolidated as a separate layer within a "one-network" environment. Additionally, by way of example, MCD 116 may be a data-enabled mobile handheld device capable of receiving and sending messages, web browsing, interfacing with corporate application servers, et cetera, regardless of the relationship between the networks 110 and 112. Accordingly, a "network node" may include both relay functionality and wireless network infrastructure functionality in some exemplary implementations.

For purposes of the present patent application, the wireless packet data service network 112 may be implemented in any known or heretofore unknown mobile communications technologies and network protocols, as long as a packet-switched data service is available therein for transmitting packetized information. For instance, the wireless packet data service network 112 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 112 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any $3^{rd}$ Generation (3G) network. As will be seen hereinbelow, the embodiments of the present patent application for securing a personalized indicium such as a PIN with respect to MCD 116 will be described regardless of any particular wireless network implementation.

Figure 2:
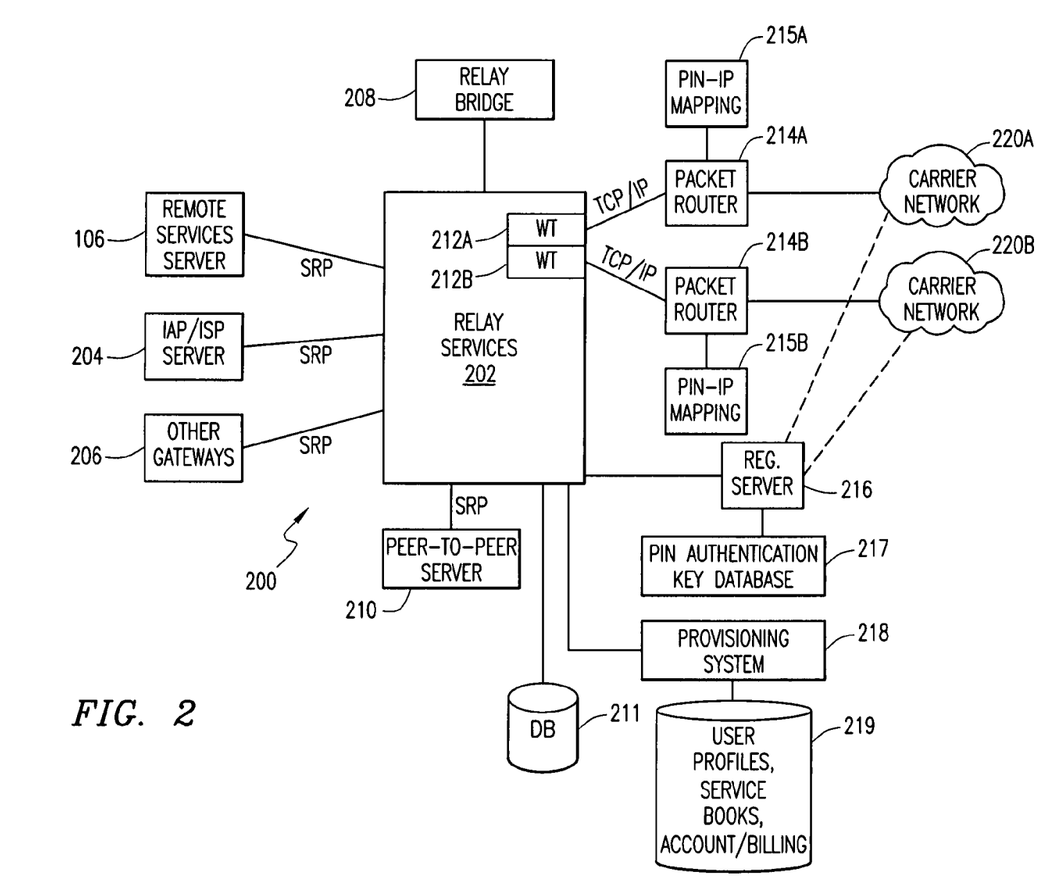
FIG. 2 depicts additional details of an exemplary relay network operable with a mobile communications device in accordance with an embodiment.

FIG. 2 depicts additional details of an exemplary relay network infrastructure 200 operable as part of relay network 110 interfacing with the wireless packet data service network 112 described above. A relay services node 202 is operable, at least in part, for providing connectivity between MCDs and various data application services (enterprise services, external IP data services, et cetera), regardless of the geographic location of the MCDs and their respective wireless carriers. Also, since multiple relay services nodes can co-exist in a distributed network architecture, a relay bridge 208 may be provided in operable connection with the relay services node 202 for supporting inter-relay connectivity. In one implementation, relay bridge 208 connects with separate relay node sites, forming tunnels between relays over which MCD messages can flow to and from services, irrespective of the region where the MCD is in.

Communication between the relay services node 202 and various application gateways and servers is effectuated using any suitable protocol, e.g., Server Relay Protocol (SRP), preferably over IP links. By way of illustration, remote services server 106 associated with the enterprise network 102 (shown in FIG. 1) communicates with the relay using SRP for effectuating internal data services with respect to the enterprise's mobile subscribers. Likewise, reference numerals 204 and 206 refer to external application gateways, such as Internet Service Provider (ISP) or Internet Access Provider (IAP) servers, and other gateways, respectively, which are also interfaced with the relay node 202 using SRP. A peer-to-peer server 210 may also be provided in operable connection with the relay node 202 for handling peer-level messaging between two MCDs using their respective PIN indicia.

Additionally, a database 211 may be provided in operable connection with the relay node 202 for handling and managing MCD location information. Preferably, this location information is stored by PIN indicia of the MCDs, which may be programmed into the devices at the time of manufacture or dynamically assigned afterwards, wherein the records maintain a particular device's last known location. A registration server 216 is operable for providing registration services for MCDs when they are initially activated or when the user reregisters due to moving to a different wireless network coverage area. Depending on the type of software bundled with the MCD, the registration process between it and the registration server may proceed in unencrypted fashion (i.e., cleartext registration requests and responses) or in some form of encrypted fashion (i.e., secure registration) upon establishing a common "session key" that may be transferred in accordance with known or heretofore unknown cryptographic methodology. In one embodiment, where a secure registration process is implemented, a database 217 associated with the registration server 216 is operable for storing a PIN authentication key provided by the MCD during its registration with the network. As explained in detail in the following commonly owned co-pending patent application entitled "SYSTEM AND METHOD FOR SECURING A PERSONALIZED INDICIUM ASSIGNED TO A MOBILE COMMUNICATIONS DEVICE," filed Nov. 24, 2004, application Ser. No. 10/996,702, cross-referenced hereinabove, the PIN authentication key facilitates, among others, a mechanism for securing the PIN indicium assigned to the MCD. Furthermore, since the PIN authentication key may be required as part of the secure registration process, the network logic is operable to manage the updating of the authentication key (i.e., clearing a previous authentication key, storing a new authentication key, et cetera) based on whether the MCD reverts to a downgraded registration process (i.e., unencrypted registration process) after being provided with the upgraded secure registration process.

One or more wireless transport (WT) interfaces are provided as part of relay services node 202 for connecting with wireless carrier networks that service MCDs. By way of illustration, WT 212A and WT 212B communicate with respective packet routers 214A and 214B using TCP/IP links, which route data packets to and from respective wireless packet data service networks, exemplified in FIG. 2 as carrier network 220A and carrier network 220B. To facilitate accurate routing, packet routers 214A, 214B are provided with PIN-IP mapping tables 215A and 215B that are used to route packets over IP networks. When a WT addresses a packet by PIN, the corresponding packet router interrogates the mapping table to look up and retrieve the current IP address for the MCD. In one implementation, the packet routers are operable to update the IP address of the MCD in the mapping tables every time they receive a packet. In another implementation, the IP-PIN mapping tables may be updated as necessary, e.g., when the IP address of an MCD is changed because it is dynamically assigned and may be reclaimed after the MCD has roamed out of a serving area.

Continuing to refer to FIG. 2, registration server 216, which handles administration and registration services for MCDs, may also be provided with separate WT and packet routing for interfacing with the carrier networks 220A, 220B, although not specifically shown. A provisioning system (PRV) 218 may be co-located or otherwise associated with the relay services node 202 for setting up and managing various service providers (i.e., carrier networks), subscribers, MCD manufacturers, resellers, and other entities in order to support any number of service and market differentiation requirements. Additionally, the provisioning system 218 may include logic for provisioning personalized indicia (e.g., PIN assignment and management) with respect to the MCDs. Also, subscriber validation logic may be provided as part of the provisioning system 218. A service provisioning database 219 is therefore associated with the provisioning system 218 for maintaining subscriber/user profiles, service books, accounting information, et cetera, based on PINs, hard-coded device identifiers as well as subscriber identifiers, and other indicia.

One skilled in the art should appreciate that the various databases and service logic processing set forth above with respect to the relay network may be realized in suitable hardware, firmware and/or firmware logic blocks or in combination thereof. Furthermore, as alluded to before, the functionality of the relay network may also be integrated within a wireless carrier network, whereby a "network node" may generally comprise the relay layer functionality as well.

Figure 3:
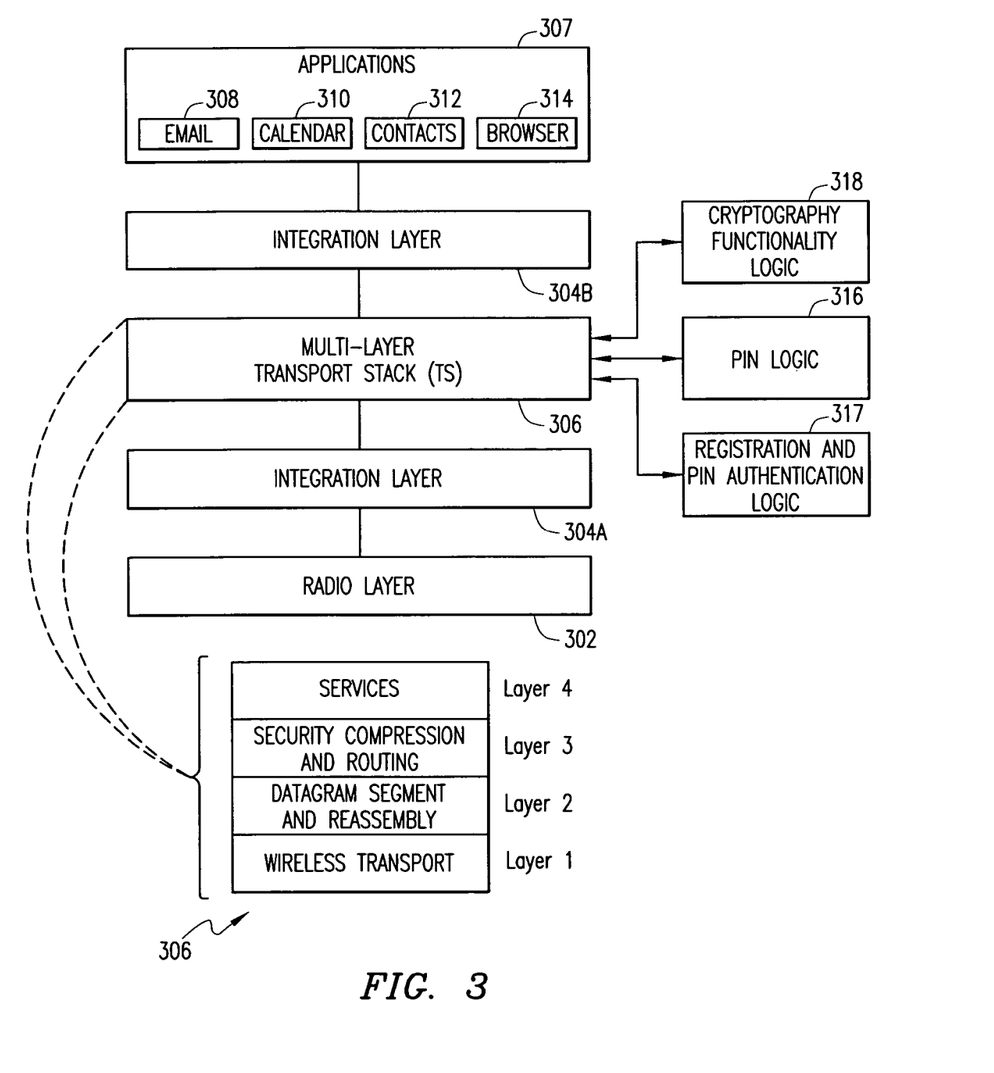
FIG. 3 depicts a software architectural view of a mobile communications device (MCD) according to one embodiment.

FIG. 3 depicts a software architectural view of a mobile communications device operable according to one embodiment. A multi-layer transport stack (TS) 306 is operable to provide a generic data transport protocol for any type of corporate data, including email, via a reliable, secure and seamless continuous connection to a wireless packet data service network. As illustrated in the embodiment of FIG. 3, an integration layer 304A is operable as an interface between the MCD's radio layer 302 and the transport stack 306. Likewise, another integration layer 304B is provided for interfacing between the transport stack 306 and the user applications 307 supported on the MCD, e.g., email 308, calendar/scheduler 310, contact management 312 and browser 314. Although not specifically shown, the transport stack 306 may also be interfaced with the MCD's operating system. In another implementation, the transport stack 306 may be provided as part of a data communications client module operable as a host-independent virtual machine on a mobile device.

The bottom layer (Layer 1) of the transport stack 306 is operable as an interface to the wireless network's packet layer. Layer 1 handles basic service coordination within the exemplary network environment 100 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

A PIN logic module 316 provided as part of the MCD's software environment is disposed in operable communication with the transport stack 306 as well as the OS environment. In one embodiment, the PIN logic module 316 comprises logic operable to request a PIN indicium from the provisioning network in a dynamic assignment, wherein a temporary PIN may be generated for effectuating pre-registration communication with the network. Alternatively, the PIN logic may include storage means for storing a PIN that is encoded during manufacture. Regardless of the PIN assignment mechanism, once a PIN is persistently associated with an MCD, it is bound to at least one of the MCD's hardware device identifier and/or a subscriber identifier (collectively, "identifier") such as, e.g., International Mobile station Equipment Identity (IMEI) parameters, International Mobile Subscriber Identity (IMSI) parameters, Electronic Serial Number (ESN) parameters, Mobile Identification Number (MIN) parameters, et cetera, that are associated with MCDs depending on the wireless network technologies and protocols.

Continuing to refer to FIG. 3, a registration and PIN authentication logic module 317 provided as part of the MCD's software environment is disposed in operable communication with the transport stack 306 as well as the OS environment for effectuating registration procedures and/or PIN authentication services (e.g., generation of a PIN authentication key for transmission via a registration request to the network, generation of authentication values, e.g. digital signature generation, et cetera). Depending on the OS provided with the MCD, one or more versions of the registration process may be effectuated by the MCD, at least temporarily for a defined time window. For example, where the MCD is initially provided with an OS that supports only unencrypted registration, the registration module 317 is operable for sending cleartext registration requests (which do not require the PIN authentication key) to the network node and for processing cleartext registration responses provided by the network node. On the other hand, if the MCD is provided with an OS that supports secure registration requiring the PIN authentication key services, a cryptography module 318 is operable for effectuating appropriate cryptographic algorithms that are utilized in encryption/decryption of the registration messages (i.e., encrypting the requests to the network node and decrypting the responses from the network node).

Also provided in association with the registration/PIN authentication logic module 317 is logic for selecting between two versions of the registration process that the MCD may acquire. Preferably, where a downgraded version (i.e., one without the encryption capability) is initially provided with the MCD, an upgraded version (i.e., one capable of supporting secure registration) may be subsequently downloaded or otherwise provided to the MCD with a time window associated therewith. The registration logic of the MCD is capable of changing between the two versions within the time window by sending appropriate indications in its registration requests. In one implementation, the MCD is operable to send an upgraded registration request that includes a registration cause code, e.g., [0x0000], to indicate that the device is changing to its previous registration process, i.e., the downgraded registration process. Within a defined time window thereafter, e.g., a week, a month, etc., the MCD may downgrade to the previous registration process, whereupon the network logic is operable to clear the PIN authentication key initially generated by the MCD with respect to the upgraded registration process. After the time window for downgrading has passed, the authentication key may be removed by administrative action so as to allow the MCD to create a new key (for operation with the upgraded registration process) or to continue using the previous registration process.

Figure 4:
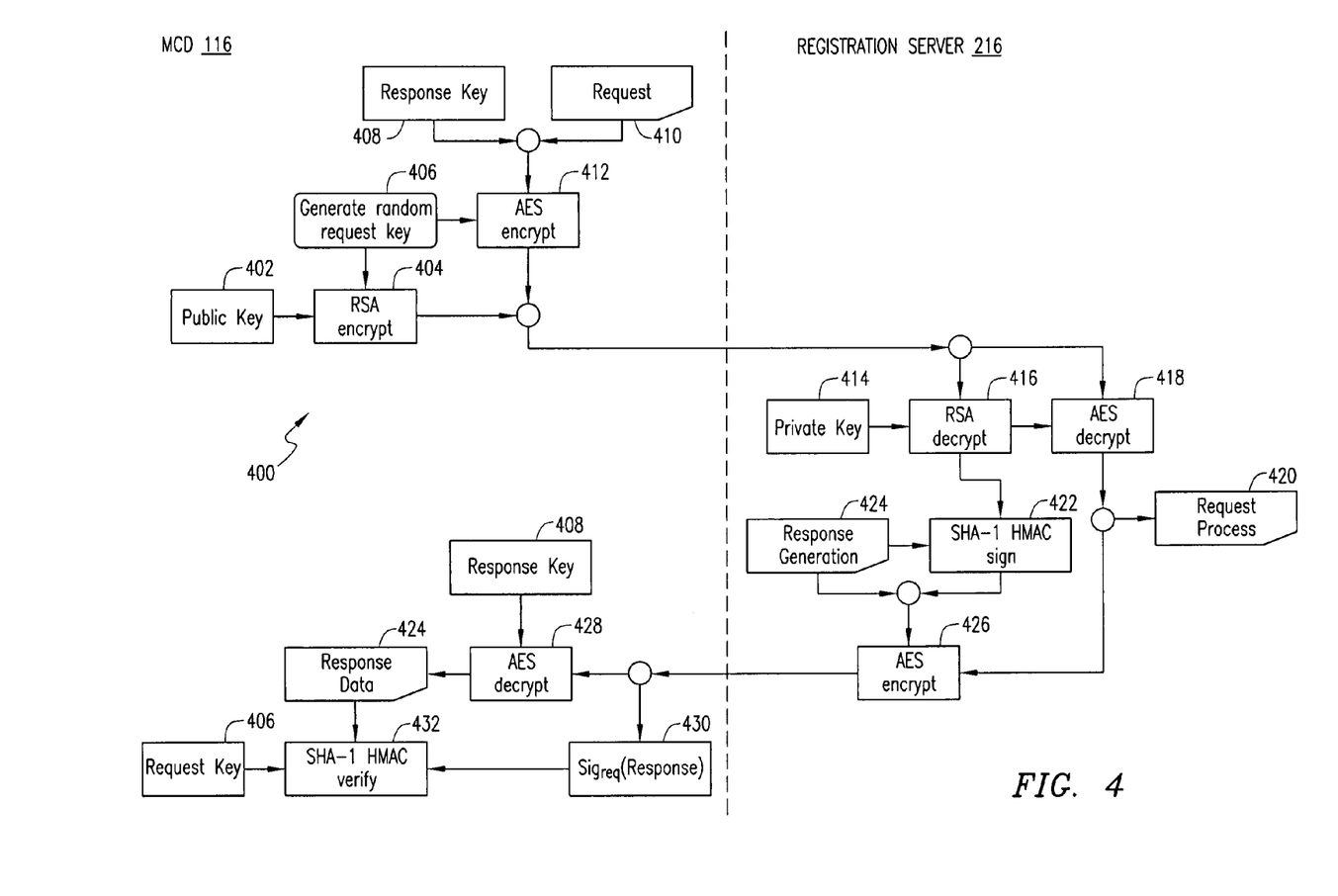
FIG. 4 depicts an exemplary encryption scheme operable with an upgraded registration process of an MCD according to one embodiment.

FIG. 4 depicts an exemplary cryptography scheme 400 operable with an upgraded registration process of an MCD according to one embodiment. As will be seen below, a plurality of encryption/decryption algorithms may be utilized in implementing a secure registration process within the context of the present application. It should be appreciated, however, that although the cryptography scheme 400 utilizes a particular combination of known techniques such as the Rivest-Shamir-Adelmen (RSA) algorithm, Advanced Encryption Standard (AES) algorithm, and Secure Hash Algorithm (SHA), other encryption/decryption algorithms with varying cipher sizes may also be implemented in further embodiments.

In the embodiment depicted in FIG. 4, the cryptography scheme 400 involves the logic and processing of both MCD 116 as well as the network node logic as exemplified by registration server 216. Preferably, a multi-layer encryption system is implemented between MCD 116 and registration server node 216, where a public key/private key scheme is used in conjunction with other cryptographic techniques. Accordingly, a public key 402 associated with registration server 216 is embedded in MCD 116, with a corresponding private key 414 being stored in the registration server itself. For each registration request, the MCD generates a random request key as provided in block 406. If a response key 408 does not exist in the device, however, the logic provided with the device is operable to generate a new key randomly which is appropriately stored so that the device can decrypt the response upon receipt.

Once the registration request data 410 is generated, the MCD then encrypts the request data 410 and the response key 408 with the request key using an AES procedure (block 412). Additionally, the MCD encrypts the request key using an RSA procedure (block 404). The encrypted request key, registration request data, and the response key are transmitted to the network node, i.e., registration server 216. Upon receiving the encrypted registration message, the registration server decrypts the first portion of the message with its private key 414 using RSA (block 416), which accordingly yields the request key in cleartext. Thereafter, the registration server decrypts the remaining portion of the message with the request key using AES (block 418). This process accordingly yields the registration request data and the response key. Upon processing the registration request data (block 420), the registration server 216 generates a registration response 424. Thereafter, the registration server 216 signs the registration response data with the request key using SHA and corresponding Hash Message Authentication Code (HMAC) (block 422), whereby the response message's source is authenticated. The registration response data is then encrypted with the response key using AES (block 426), which is transmitted back to the MCD.

After receiving the registration response message, the device decrypts the message with its response key 408 using AES (block 428), thereby yielding the registration response data. Also, the cryptography logic provided with the device is operable to verify an authentication value (i.e., a signature) 430 against the registration response data 424 with the request key using SHA and HMAC (block 432). If valid, the MCD proceeds to process the response data. Otherwise, the response data may be dropped, giving rise to an error that can be logged. No further response messaging may thereafter be transmitted to the registration server.

Figure 5:
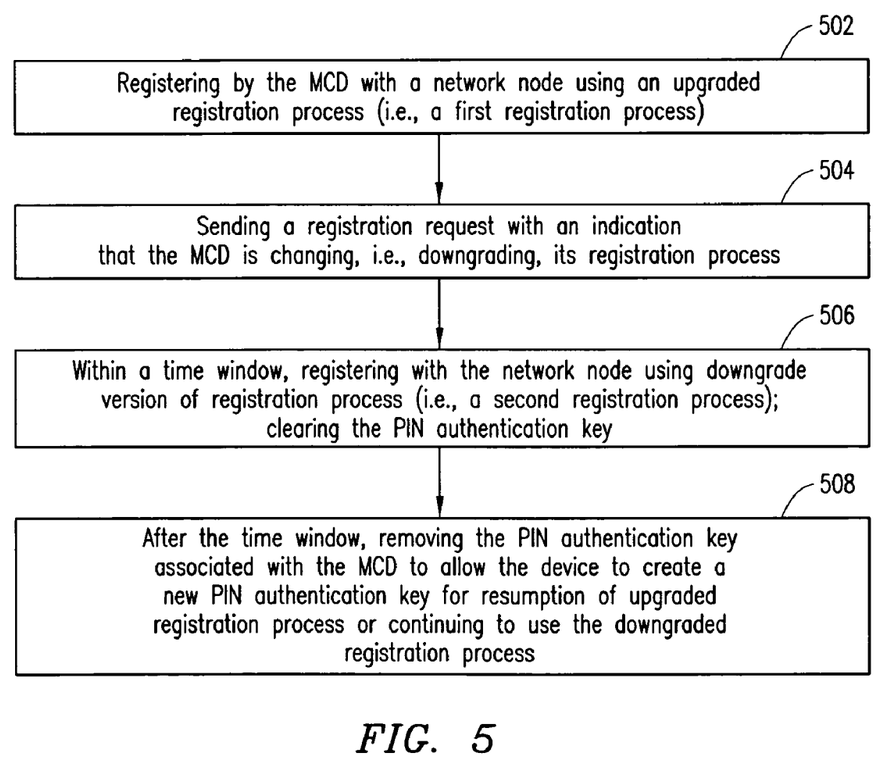
FIG. 5 is a flowchart of an embodiment for managing multiple versions of the registration process for an MCD.

Referring now to FIG. 5, depicted therein is a flowchart of an embodiment for managing multiple versions of the registration process for an MCD wherein the possibility of a "downgrade attack" is minimized. As shown in block 502, the MCD is operable to register with a network node using an upgraded registration process (i.e., a first registration process) that is downloaded or otherwise provided to the MCD. In one exemplary embodiment, the upgraded registration process involves transmitting and receiving registration messages (i.e., requests and responses) in an encrypted format. Furthermore, the upgraded registration process requires a PIN authentication key for effectuating proper functionality. The MCD generates a registration request (using the upgraded process) with an indication that it is changing (e.g., downgrading) its registration process (block 504). Within a time window thereafter, the user may change to a previous registration process (i.e., a second registration process), which may be downgraded version thereof that allows transmission of unencrypted registration messages (block 506). As alluded to hereinabove, the time window may be in the order of a week, two weeks, a month, and the like. Upon downgrading to the previous registration process, a request may be transmitted to the network that the PIN authentication key originally generated with respect to the upgraded registration process be cleared. The MCD is provided with the capability to select, upon expiration of the time window, between the first and second registration processes. Accordingly, after the time window has passed, the previous PIN authentication key associated with the MCD may be removed by administrative action so as to allow the device to create a new PIN authentication key for resumption of the upgraded registration process. Otherwise, the MCD may continue to use the downgraded registration process (block 508).

It should be appreciated that managing multiple versions of the MCD's registration process in accordance with the principles set forth herein allows a user to downgrade within a set period of time if the user wishes to revert to the previous software version for any reason, while avoiding a lasting security flaw where an attacker could use the downgrade version. Further, the pre-defined time interval also prevents what may be called an "upgrade attack" where an attacker could spoof an upgraded registration request to try and lock out an MCD that is operating with the downgraded version, since the MCD will be able to re-register using the downgraded version and have the invalid PIN authentication key cleared.

Figure 6:
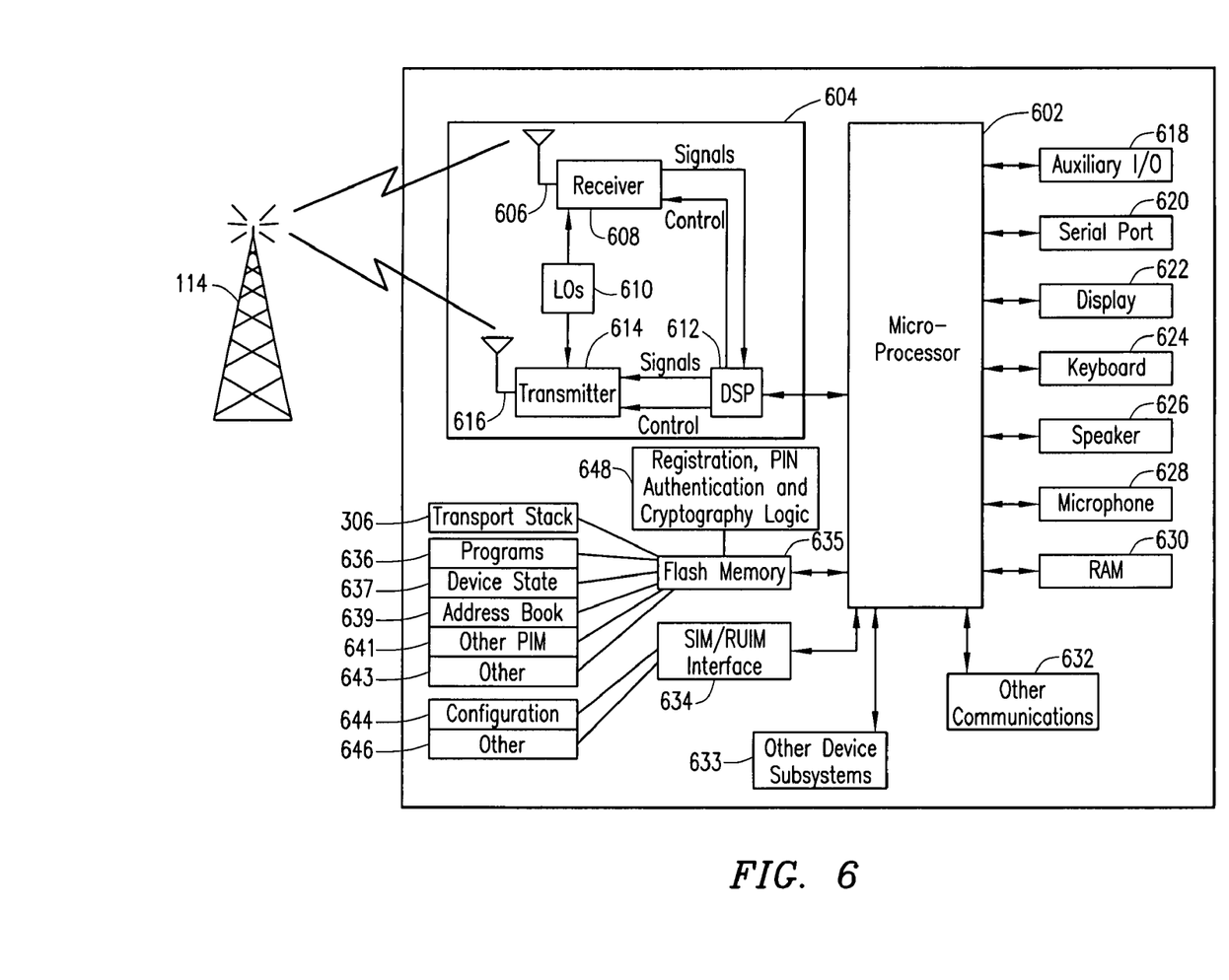
FIG. 6 depicts a block diagram of an MCD according to one embodiment.

FIG. 6 depicts a block diagram of a mobile communications device operable according to one embodiment. It will be recognized by those skilled in the art upon reference hereto that although an embodiment of MCD 116 may comprise an arrangement similar to one shown in FIG. 6, there can be a number of variations and modifications, in hardware, software or firmware, with respect to the various modules depicted. Accordingly, the arrangement of FIG. 6 should be taken as illustrative rather than limiting with respect to the embodiments of the present patent application. A microprocessor 602 providing for the overall control of an embodiment of MCD 116 is operably coupled to a communication subsystem 604 which includes a receiver 608 and transmitter 614 as well as associated components such as one or more local oscillator (LO) modules 610 and a processing module such as a digital signal processor (DSP) 612. As will be apparent to those skilled in the field of communications, the particular design of the communication module 604 may be dependent upon the communications network with which the mobile device is intended to operate. In one embodiment, the communication module 604 is operable with both voice and data communications. Regardless of the particular design, however, signals received by antenna 606 through BS 114 are provided to receiver 608, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 612, and provided to transmitter 614 for digital-to-analog (D/A) conversion, frequency up conversion, filtering, amplification and transmission over the air-radio interface via antenna 616.

Microprocessor 602 also interfaces with further device subsystems such as auxiliary input/output (I/O) 618, serial port 620, display 622, keyboard 624, speaker 626, microphone 628, random access memory (RAM) 630, a short-range communications subsystem 632, and any other device subsystems generally labeled as reference numeral 633. To control access, a Subscriber Identity Module (SIM) or Removable user Identity Module (RUIM) interface 634 is also provided in communication with the microprocessor 602. In one implementation, SIM/RUIM interface 634 is operable with a SIM/RUIM card having a number of key configurations 644 and other information 646 such as identification and subscriber-related data.

Operating system software and transport stack software may be embodied in a persistent storage module (i.e., non-volatile storage) such as Flash memory 635. In one implementation, Flash memory 635 may be segregated into different areas, e.g., storage area for computer programs 636 as well as data storage regions such as device state 637, address book 639, other personal information manager (PIM) data 641, and other data storage areas generally labeled as reference numeral 643. A logic module 648 is provided for storing a PIN assigned to the MCD, dynamically or otherwise, as well as for generating a PIN authentication key for transmission via registration. Also associated therewith is suitable logic for supporting the various secure registration processes and operations described hereinabove.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A method for managing secure registration of a mobile communications device with a network node, comprising:
   sending a first registration request to the network node to effectuate a first registration process, the first registration request including an authentication key generated by the mobile communications device;
   receiving a first registration response from the network node;
   sending a second registration request to the network node to effectuate a second registration process, the second registration process having a time window associated therewith; and
   prompting a user of the mobile communications device to select between the first and second registration process at the expiration of the time window associated with the second registration process.

2. The method according to claim 1, wherein the network node is operable with a wireless packet data service network comprising one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (ODMA) network and a Universal Mobile Telecommunications System (UMTS) network.

3. The method according to claim 1, wherein the first registration message further includes request data and a response key.

4. The method according to claim 3, wherein the first response message received by the mobile communications device includes the response key.

5. The method according to claim 1, wherein the first registration process effectuates encryption algorithms for messages to and responses from the network node.

6. The method according to claim 1, wherein the authentication key is mapped to a personalized indicium corresponding to the mobile communications device.

7. The method according to claim 6, wherein the personalized indicium comprises a Personal Information Number (PIN) that is bound to an identifier associated with the mobile communications device.

8. The method according to claim 7, wherein the identifier comprises at least one of an International Mobile station Equipment Identity (IMET) parameter, an International Mobile Subscriber Identity (IMSI) parameter, an Electronic Serial Number (ESH) parameter and a Mobile Identification Number (MIN) parameter.

9. The method according to claim 1, wherein the second registration process effectuates unencrypted data transmissions between the mobile communications device to the network node.

10. The method according to claim 1, wherein the time window associated with the second registration process is pre defined.

11. The method according to claim 1, further comprising updating a database associated with the network node.

12. A mobile communications device comprising:
   a processor configured to control at least one of a plurality of subsystems for communicating with a network node;
   the processor further configured to control at least one of the plurality of sub-systems for generating an authentication key;

the processor further configured to control at least one of the plurality of sub-systems for sending a first registration request to a network node to effectuate a first registration process with the network node, the first registration request including the authentication key;

the processor further configured to control at least one of the plurality of sub-systems for processing a first registration response received from the network node;

the processor further configured to control at least one of the plurality of sub-systems for sending a second registration request to the network node to effectuate a second registration process, the second registration process having a time window associated therewith; and the processor further configured to control at least one of the plurality of sub-systems for prompting a user of the mobile communications device to select between the first and second registration process at the expiration of the time window associated with the second registration process and thereafter process the user's selection.

13. The mobile communications device according to claim 12, wherein the network node is operable with a wireless packet data service network comprising one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network and a Universal Mobile Telecommunications System (UNTS) network.

14. The mobile communications device according to claim 12, wherein the first registration message further includes request data and a response key.

15. The mobile communications device according to claim 14, wherein the first registration response received from the network node comprises the response key.

16. The mobile communications device according to claim 12, wherein the first registration process effectuates encryption algorithms for messages to and responses from the network node.

17. The mobile communications device according to claim 12, further comprising a personalized indicium mapped to the authentication key.

18. The mobile communications device according to claim 17, wherein the personalized indicium comprises a Personal Information Number (PIN) that is bound to an identifier associated with the mobile communications device.

19. The mobile communications device according to claim 18, wherein the identifier comprises at least one of an International Mobile station Eguipment Identity (IMFI) parameter, an International Mobile Subscriber Identity (IMSI) parameter, an Electronic Serial Number (ESM) parameter and a Mobile Identification Number (MIN) parameter.

20. The mobile communications device according to claim 12, wherein the second registration process effectuates unencrypted data transmissions between the mobile communications device and the network node.

* * * * *